Sept. 22, 1931.  H. C. SMITH  1,824,240

ACOUSTICAL MATERIAL

Filed May 6, 1930

INVENTOR

Hubert C. Smith
Apr. 18, 1930

Patented Sept. 22, 1931

1,824,240

UNITED STATES PATENT OFFICE

HERBERT C. SMITH, OF LOS ANGELES, CALIFORNIA, ASSIGNOR TO COAST INSULATING CO., A CORPORATION OF DELAWARE

ACOUSTICAL MATERIAL

Application filed May 6, 1930. Serial No. 450,207.

The present invention relates to acoustical material and further pertains to the composition, manufacture and application of same.

One of the primary objects of the invention is to provide for forming this and like materials into tile or blocks having the desired acoustical effects while providing suitable strength and both attractive and durable surfaces.

Another object of the invention is to provide for rapidly aging the manufactured material, so that immediately it has been applied it is possessed of the maximum efficiency, durability and finished appearance.

Other objects and advantages will appear hereinafter and will be better understood hereinafter.

In the accompanying drawings I have illustrated one practical application and embodiment of my invention.

Figure 1:
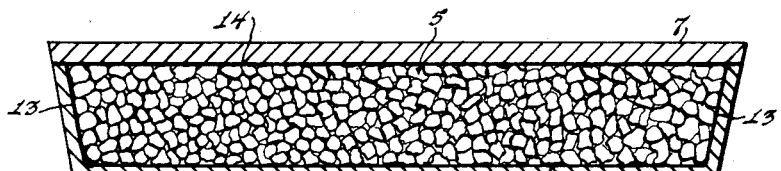
Figure 1 is a view in section of a block or tile of acoustical material being formed within a mould and in conformity with the invention.
Figure 3:
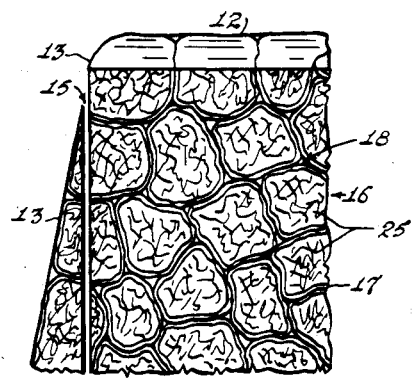
Figure 3 is a view in end elevation of the finished tile.
Figure 2:
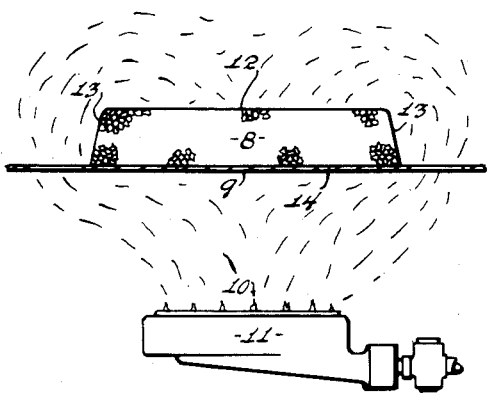
Figure 2 is a view in side elevation of the block after being treated after moulding.
Figure 4:
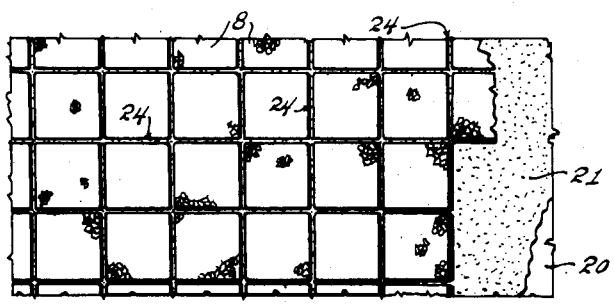
Figure 4 is a fragmentary surface view of a plurality of tile in position on a ceiling or other surface which has been treated therewith.

The first step in the manufacture of the material whether for moulding or for direct application, is to intermix suitable parts of shredded mineral wool; filler, coloring pigments (if desired), and the dry powdered constituent of a suitable cement.

In the said co-pending application I have mentioned a specific proportion for each element and have described how they are mixed, and while it is mentioned therein that this formula may be varied considerably, my subsequent experience with this material confirms the statement.

To this dry mixture there is subsequently added the fluid constituent of a cement.

I have found that the shredded wool, the filler, the coloring pigment, and the dry cement element may be mixed in a wide variety of proportions and still provide substantially the same results, provided that the percentage of wool is sufficient to make the final product light weight and porous, while the amount of dry and wet cement constituents as a total should be limited so that they do not fill the major amount of interstices between the grains and fibres of the wool and filler.

The wool, filler, coloring pigment and dry cement element are all tumbled together and the resultant dry product is composed of a multiplicity of wads of wool each surrounded by and slightly impregnated with its share of the dry cement constituent, color, and filler, respectively.

This dry, loose material may be kept in stock over any period of time and a variety of colors may be kept in stock.

If tile of all one color are to be made from this material, the material of that color is selected and put through the process now to be described. If, however, a tile of "clouded" or variegated color effect is to be produced, the various colors of the aforesaid material are selected and mixed in proper proportion. This admixture of different colors may be done either when the above mentioned dry product is taken from stock, or this admixture may be accomplished at any later time in the process now to be described.

The fluid constituent of the cement should be now added to the wads and is of such nature as to act mechanically, chemically, or hydraulically with the dry cement constituent as to ultimately bind the wads together in a mass while providing interstitial spaces between the wads; as has been set forth in the said co-pending application.

The dry cement constituent may be magnesite or the like, while the fluid constituent thereof may be magnesium chloride or the like.

Referring to the drawings, the moist product 5 in suitable amount is disposed in the mould 6 and compressed very slightly by a plane surfaced member such as 7.

As soon as desired, or as soon as the product has set slightly so that it may be handled, the resultant tile 8 is removed from the mold and placed on a plate 9 or the like in suitable proximity to an open flame 10 formed by the combustion of any suitable hydro-carbon burned in the burner 11. Natural or illuminating gas is satisfactory, although it appears that any fuel which gives off carbon di-oxide is suitable. Unnecessary quantities of diluting air are preferably kept away so that the tile is actually surrounded with and treated by an atmosphere quite thoroughly saturated with carbon di-oxide. Of course, heat may aid in curing but dehydration or drying with heat is not evidently as important a consideration as the saturation of the exposed surfaces of the tile, with carbon di-oxide.

This process evidently results in the rapid carbonization of the tile surface, or in other words, the alkaline compound in the tile evidently is converted, on the surface of the tile at least, to a carbonate which results in a thin crust or shell being formed on the surface and having a more dense and finished surface than would otherwise occur.

When the cured tile is removed from the plate 9, its outer surface 12 is cured as is also its inclined outwardly converging side surfaces 13, 13, etc., formed by the mould. The bottom surface 14 of the tile may remain uncured.

Now the side surfaces 13, 13, etc. of the tile are partially trimmed off along the line 15 as by a band saw or the like (not shown) so that the inner material is exposed as at 16. This exposed surface shows that the cut is made directly through the wads and an examination thereof will show that each wad is surrounded by a film 17 of cement which joins that wad to the adjacent wads while leaving interstitial spaces 18. Further examination will show that the cut is made directly through some of the wads thereby exposing to view the soft, uncemented fibrous structure of the mineral wool wads, as at 16.

In applying the tile to a surface such as a ceiling surface 20, they are placed in close juxtaposition so that they abut one another only by counter-contact of the exposed fibrous and resilient interior of the wads.

Any well-known means of applying the back surface of the tile to the surface or ceiling 20 may be employed. One method which I have found suitable is to apply a suitably tacky thin coat of plaster 21 to the surface 20 and then apply the back of the tile thereto so that the tile is cemented to the ceiling. It will be noted that the back surface of the tile, if uncured by setting on the plate 9 may have better adhesion to the cement than if it had been treated, and the tile as a whole is more resiliently associated with the surface to which it is applied.

As to the acoustical properties; it is evident from the foregoing that structurally the tile is ideally suited to the absorption of sound waves while at the same time its outward surface has a suitably durable and finished appearance while the great multiplicity of interstices opening to the air, are not visible at any reasonable distance. The exposed surface, while having suitably artistic appearance is not readily abraded by contact and will not hold dust in the manner characteristic of a more fibrous surface. At the same time this finished surface is not a co-extensive shell but is repeatedly interrupted by the interstices between wads and the outer surface of each outer wad is directly backed by a resilient wool interior.

By limiting the saw cut so that the edges 23 of each tile are still beveled slightly at the joints, spaces 24 are left between the outer surfaces of adjacent tile and these spaces converge inwardly to the raw, cut edges of the tile. These inwardly converging spaces each leading directly to the soft interior of the tile have highly efficient characteristics in absorbing sound waves and the joint spaces, so provided, improve the appearance of the surface to which they are applied as well as having the advantageous functions mentioned.

Of course, as has been explained in the said co-pending application, the product may be applied directly to a ceiling by being suitably troweled thereon, and obviously the improvements set forth herein may be employed in so applying the moist product. In such case multi-tone color effects may be produced by admixture of stock of different colors, either before or after the admixture of the fluid constituent. Also the above process of aging or carbonizing may be carried out by closing the room in which the plaster is applied and operating a hydro-carbon burner therein as long as necessary to cure the exposed surface.

While I have shown and described a specific manner of applying the invention to treat a surface acoustically, and while I have been somewhat specific as to ingredients and proportions and sequence of the steps for arriving at the final result, this has been done only to describe one practical application of my invention and does not impose limitations to the broad scope of my invention.

I claim:

1. An acoustical material composed of fibrous wads each surrounded and joined to one another by cement coatings; limited to provide interstitial spaces between the wads; the exposed surface of the material being of greater density than the remainder of such coatings.

2. An acoustical material composed of fibrous wads each surrounded and joined to one another by cement coatings limited to provide interstitial spaces between the wads, the exposed surface of said material having been subjected to the action of products of combustion of a hydro-carbon fuel.

3. An acoustical material composed of fibrous wads each surrounded and joined to one another by cement coatings; limited to provide interstitial spaces between the wads; the exposed surface of said material being provided by said cement coatings and having been subjected to the action of products of combustion.

4. The method for curing a plaster composition having an alkaline cement binder; the method consisting in subjecting the composition to the action of products of combustion of a hydro-carbon fuel.

5. The method for manufacturing acoustical material, the method consisting in providing fibrous wads, surrounding the wads each with a powdered cement constituent and a coloring material, stocking such material in various colors, mixing various colors of material, so made, as required for use, impregnating the wads with a fluid cement constituent, causing the product to set so that the wads adhere to one another to form a foraminous structure, and curing this structure by exposing the surface thereof to the action of products of combustion.

6. An acoustical tile composed of fibrous wads each surrounded by a cement coating binding the wads together in a porous structure, the exposed surface of such tile being treated so as to be of increased density while providing interstitial spaces between the outermost wads.

7. An acoustical tile composed of fibrous wads each surrounded by a cement coating binding the wads together in a porous structure, the exposed surface of such tile being treated so as to be of increased density while providing interstitial spaces between the outermost wads, the original side edges of said tile being cut away to expose the inner structure of adjacent wads.

8. The method for manufacturing acoustical tile which consists in providing a multiplicity of fibrous wads, surrounding each wad with a cement coating, causing the cement coating to loosely join the wads in a foraminous tile structure, treating the exposed surfaces of the outermost wads to form a hardened shell over the outer surface and the side edges respectively of said tile, and subsequently cutting away portions of the side edges of said tile to thereat expose the inner fibrous structure of adjacent wads.

HERBERT C. SMITH.